(12) United States Patent
Morris

(10) Patent No.: US 7,103,756 B2
(45) Date of Patent: Sep. 5, 2006

(54) DATA PROCESSOR WITH INDIVIDUALLY WRITABLE REGISTER SUBWORD LOCATIONS

(75) Inventor: Dale Morris, Steamboaat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 439 days.

(21) Appl. No.: 10/261,131

(22) Filed: Sep. 30, 2002

(65) Prior Publication Data

US 2004/0064677 A1    Apr. 1, 2004

(51) Int. Cl.
*G06F 9/34*    (2006.01)

(52) U.S. Cl. ........................................ 712/218

(58) Field of Classification Search ............... 712/5, 712/225, 218
See application file for complete search history.

(56) References Cited

U.S. PATENT DOCUMENTS

| | | | |
|---|---|---|---|
| 5,442,769 A * | 8/1995 | Corcoran et al. ........... 710/316 |
| 5,881,257 A | 3/1999 | Glass et al. | |
| 6,014,684 A * | 1/2000 | Hoffman ....................... 708/620 |
| 6,223,277 B1 * | 4/2001 | Karguth ....................... 712/224 |
| 6,260,088 B1 * | 7/2001 | Gove et al. .................. 710/100 |
| 6,334,183 B1 * | 12/2001 | Blomgren et al. ........... 712/221 |
| 6,654,870 B1 * | 11/2003 | Barry et al. ................... 712/24 |

OTHER PUBLICATIONS

Intel386 DX Microprocessor, Microprocessors, Vol. II, Intel, 1992.*

* cited by examiner

*Primary Examiner*—William M. Treat

(57) ABSTRACT

A data processor includes program registers with individual byte-location write enables. Bypass networks allow a precision pipeline to respond to read requests by accessing a program register or pipeline stage on a byte-by-byte basis. The data processor can thus write to individual byte locations without overwriting other byte locations within the same register. The data processor has an instruction set with instructions that combine two operands and yield a one-byte result that is stored in a specified byte location of a specified result register. Eight instances of this instruction can pack eight results into a single 64-bit result register without additional packing instructions and without using a read port to read the result register before writing to it. As plural functional units can write concurrently to different subwords of the same result register, a system with four functional units can pack eight results into a result register in two instruction cycles.

2 Claims, 3 Drawing Sheets

DATA PROCESSOR WITH INDIVIDUALLY WRITABLE REGISTER SUBWORD LOCATIONS

BACKGROUND OF THE INVENTION

The present invention relates to data processing and, more particularly, to data processors that operate on data subwords in parallel. A major objective of the invention is to enhance performance while executing parallel subword operations.

Much of modern progress is associated with advances in computer technology, which has provided increasing performance while lowering costs. One of the ways that performance has improved has been to increase the word size, i.e., the maximum number of bits that can be treated as a single unit by a data processor. Early processors manipulated information one byte (eight bits) at a time, while modern processors are characterized by word sizes of 32-bits, 64-bits, or greater.

To take advantage of the large word sizes available, some modern processors include instructions that treat source and destination registers as being composed of multiple subword values, and operate on these subwords in parallel. Such "parallel subword" instructions are typically used for multimedia applications, where a given computation is typically done over a large number of small values (for example, 8-bit or 16-bit pixels). Having instructions that perform this computation on multiple values packed into a register (for example, eight 8-bit or four 16-bit values in a 64-bit register) in parallel takes full advantage of the data path widths in the processor, and accelerates the computation.

The performance advantages offered by parallel subword instructions can be offset by instructions required to pack the operand data. One common form of instruction stores a subword result in the least-significant subword location of a register, setting all other subword locations with default zeroes. Such results can be shifted relative to each other (filling vacated locations with default zeros) so that they can be combined by adding or ORing to achieve the desired packing. In the case of a 64-bit register and one-byte results, seven shift operations and seven additions can be required for packing. Thus, a total of fourteen instructions are required to pack the subwords so that a parallel subword operation can be performed.

Specialized packing instructions can reduce the number of additional instructions required to pack results initially stored in the same subword location of different registers. For example, "Mix" instructions implemented in the Itanium 2 processor effectively perform shifting and combining so that only seven mix instructions are required to pack eight one-byte results into a single 64-bit register.

If instead of storing all results in the same (e.g., least-significant) subword location, instructions store results in different subword locations, separate shifting instructions are not required. Thus, the instructions can specify different subword locations for their respective result registers, filling all unspecified subword locations of the result register with default zeroes. In that case, only addition or OR instructions are required to pack results. For example, seven OR instructions can be used to pack eight one-byte results into a single register.

By storing successive subword results in different subword locations of the same register, the need for separate packing instructions can be eliminated. However, this requires that each instruction preserve the contents of subword locations not used to store the result. This can be accomplished by reading the result register, modifying the contents so read by replacing the specified subword location with result data, and then overwriting the result register with the modified data.

While these "self-packing" instructions eliminate the need for the additional packing instructions, they do require that a read port be dedicated to reading the result register so that some of its contents can be preserved. The read port so used is thus unavailable for operand data, thus reducing the amount of data that can be processed per instruction. Where there are only two register read ports, which is typically the case for general purpose processors, only one port remains available for operand data. Since parallel subword instructions require at least two read ports for operand data, this approach is not compatible with such instructions in the context of a general-purpose processor.

While it is possible to design a processor with three read register read ports, this is considered excessive in the context of general-purpose processor design, where the number of register read ports is typically two. Thus, only the first three approaches to packing results are compatible with parallel subword and other two-operand instructions in the context of a general-purpose processor design. What is needed is an approach that minimizes the instruction count required to pack parallel subword instruction results while being compatible with two-operand instructions in the context of a general-purpose processor.

SUMMARY OF THE INVENTION

The present invention provides a data processor having a register file with individually writable subword locations. In other words, an execution unit of the data processor can write a single subword to a specified subword location of a specified program register without overwriting contents of the result register outside that subword location and without first having to read the result register.

The invention further provides that the minimum granularity of write operations can be less than the minimum granularity of read operations. More specifically, the invention provides for processors which access entire words in read operations, but can access either entire words or subwords in write operations. Optionally, the invention provides for subword reads as well as subword writes.

The data processor can have an instruction set with "self-packing" instructions that compute a result and then store it in a specified subword location of a specified register while preserving the contents of other subword locations of the same register. Such instructions are "self-packing" in that successive such instructions can store results in different subword locations of the same result register so that the results are packed without further packing instructions (such as OR, Add, Shift, and Mix).

In the context of precision-pipelined parallel data processors, the invention provides bypass circuitry that selects a register file location or a pipeline location on a subword-by-subword basis in response to a read request. Herein, "precision" characterizes a pipelined architecture that yields the same results as would a non-pipelined processor (even when exceptions occur) executing the same instructions. During a write operation, scoreboard logic of the bypass circuitry tracks the location of the most-recently computed value for each register subword location. Usually, the location is in the specified register, but if the contents for that location have been recently recomputed, the expected contents may still be in the pipeline. Scoreboard logic of the bypass circuitry tracks the location of data in the pipeline in association with the data's intended storage location. During a read operation, the bypass circuitry retrieves the most recently computed value from its current pipeline location if it has not already been written to the specified register file.

The scoreboard logic tracks recently computed values on a subword-by-subword basis so that the bypass logic can assemble a response to a read response from different pipeline locations if necessary. Thus, if several instructions in a row write to different subword locations of the same result register, the bypass circuitry can retrieve some subwords from the result register and others from various pipeline stages.

The invention further provides that the different functional units of a parallel processor can write concurrently to different subword locations of the same register. Thus, the number of cycles required to pack a register can be reduced in proportion to the number of functional units. If the number of functional units equals or exceeds the number of subwords, a register can be packed in one instruction cycle. This reduces the dependency depth of program segments designed to pack registers, enhancing throughput and simplifying programming.

The present invention provides for self-packing instructions, thus minimizing program code and providing higher-performance data manipulation where data packing is employed. Because no read port is used for preserving the contents of unspecified subword locations of a specified result register, all register read ports are available for reading operands, thus enhancing the amount of work that can be accomplished with a single instruction. Where plural functional units write to respective subwords of a common result register, dependency depth can be minimized-further enhancing performance. For applications such as video processing and data encryption in which many operations are performed on small units of data, the invention provides for substantial performance enhancements, especially in the context of precision-pipelined parallel architectures. These and other features and advantages of the invention are apparent from the description below with reference to the following drawings.

DETAILED DESCRIPTION

Figure 1:
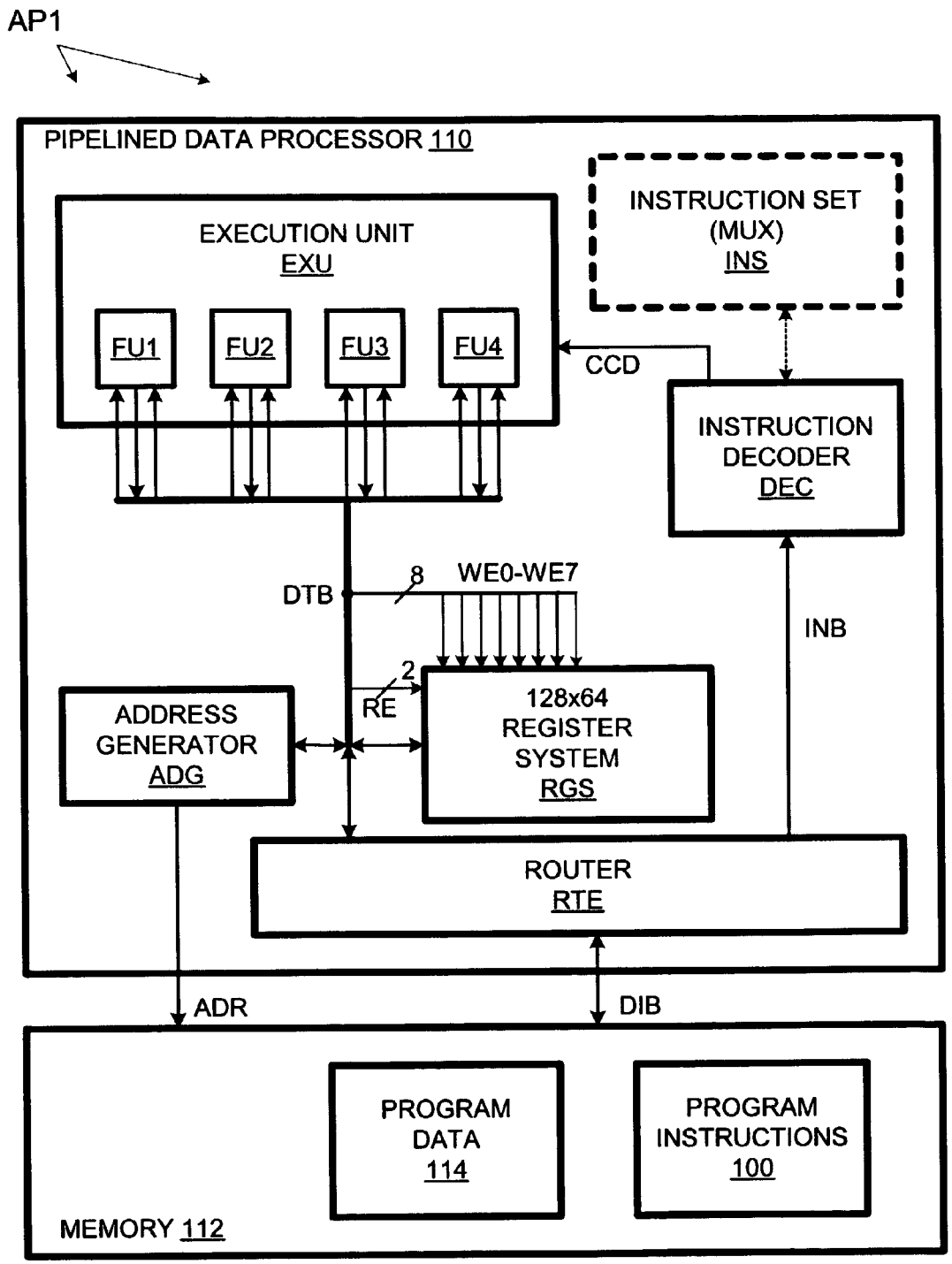
FIG. 1 is a schematic diagram of a computer system having a data processor in accordance with the present invention.

A computer system AP1 includes a pipelined parallel data processor 110 and memory 112, as shown in FIG. 1. The contents of memory 112 include program data 114 and instructions constituting a program 100. Data processor 110 includes an execution unit EXU, an instruction decoder DEC, a register system RGS, an address generator ADG, and a router RTE.

In accordance with the present invention, register system RGS has individual write enables WE0–WE7 for each register subword location. In addition, there are two read enable lines associated with register system RGS for each of the functional units, one for each of the two read ports associated with each functional unit. Thus, while register system RGS is subword addressable for write operations, it is only register addressable for read operations. In this sense, the minimum granularity of write operations is less than the minimum granularity for read operations. Unless otherwise indicated, general-register system RGS includes all general-purpose registers referenced and illustrated herein Execution unit EXU includes four functional units FU1–FU4. Generally, each functional unit performs operations on data 114 in accordance with program 100. To this end, each functional unit can command (using control lines ancillary to internal data bus DTB) address generator ADG to generate the address of the next instruction or data required along address bus ADR. Memory 112 responds by supplying the contents held at the requested address along data and instruction bus DIB.

As determined by indicators received from each functional unit FU1–FU4 along indicator lines ancillary to internal data bus DTB, router RTE routes instructions to instruction decoder DEC via instruction bus INB and data along internal data bus DTB. The decoded instructions are provided to the functional units via control lines CCD.

Associated with data processor 110 is an instruction set of instructions INS that can be decoded by instruction decoder DEC and executed by execution unit EXU. Program 100 is an ordered set of instructions selected from instruction set INS. For expository purposes, data processor 110, its instruction set INS, and program 100 provide examples of all the instructions described herein unless otherwise indicated.

Data processor 110 has a pipelined architecture. The pipeline includes a "front-end" and a "back-end". The front-end of the pipeline begins with an instruction fetch and ends with instruction decoding by decoder DEC. The back-end begins with the reading of operands and ends with the writing of a result to a program-accessible location, e.g., within register file RGS.

Figure 2:
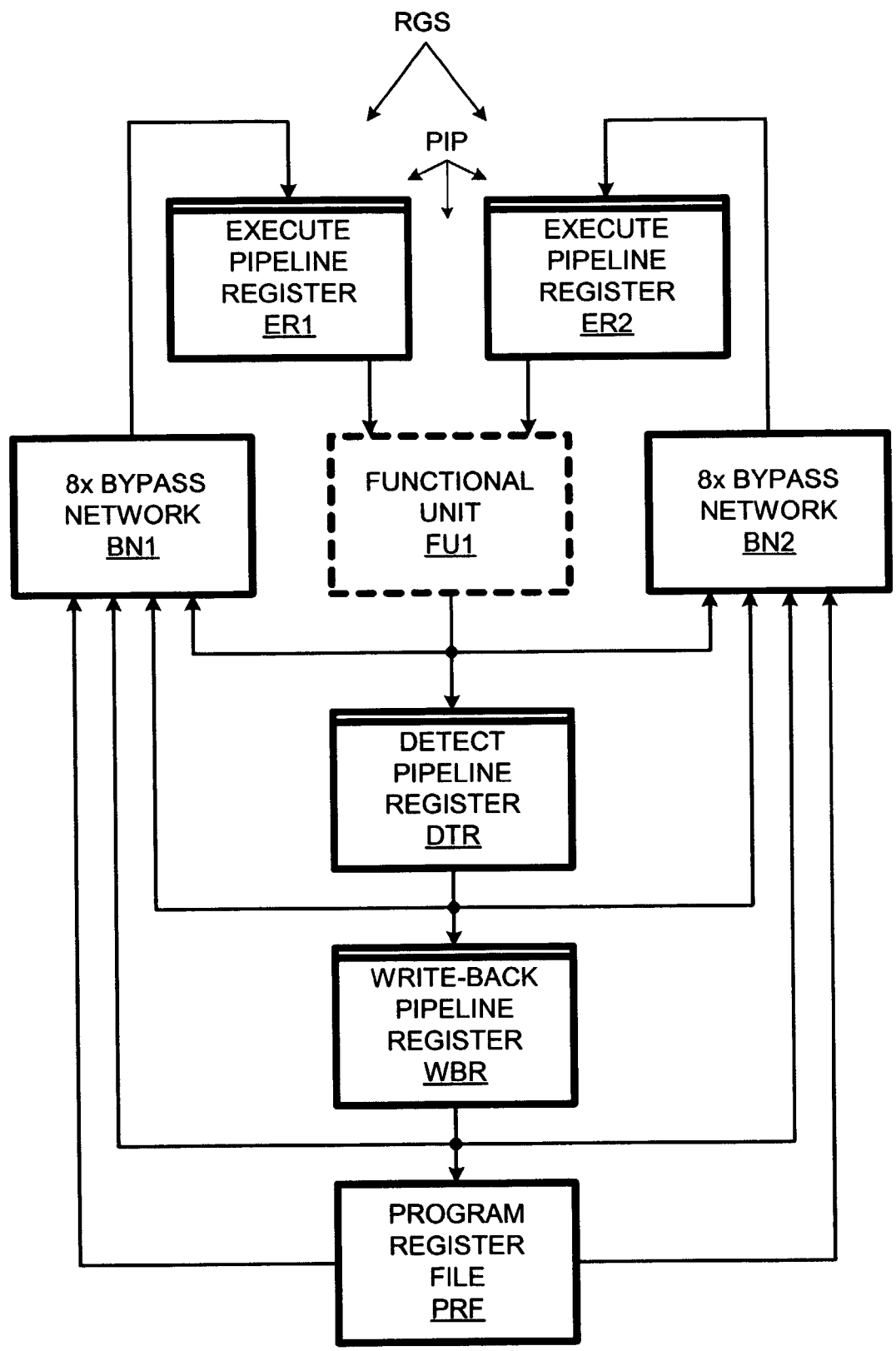
FIG. 2 is a schematic diagram of a register system of the data processor of FIG. 1.

Register system RGS is shown as it relates to functional units FU1–FU4 in FIG. 2; while the discussion referencing FIG. 2 addresses functional unit FU1, the description applies as well to functional units FU2–FU4. Register system RGS encompasses a program register file PRF, two "execute" pipeline registers ER1 and ER2, a detect pipeline register DTR, a "write-back" pipeline register WBR, and two bypass networks, BN1 and BN2.

The back-end of pipeline PIP (FIG. 2) for processor 110 (FIG. 1), has three stages. The first is an operand-execute stage, in which one or two operands stored in execute pipeline registers ER1 and ER2 are operated on to produce a result. The result is passed to detect pipeline register DTR. In the second back-end stage, an exception detector is polled to determine whether any exceptions have been triggered that would prevent the result from being written to program register PRF if the program instructions were executed in order. In the normal case in which no exceptions are indicated, the results are passed to write-back pipeline register WBR. In the third back-end stage, the results are written to the result register indicated in the instruction that called for the result.

Processor 110 embodies a precision-pipelined architecture, meaning that, from a software perspective, its results do not differ from what they would be if the processor were not pipelined. However, since processor 110 is pipelined, it is possible for an instruction to call for a result of a previous instruction before that result has been written to program register file PRF. In accordance with the precision architecture, bypass networks BN1 and BN2 ensure that the values that would be expected in a non-pipelined architecture are provided in response to a read operation whether those values are to be found in program register file PRF or somewhere in pipeline PIP.

If the value to be read has not been changed in the last three instruction cycles, it is read from program register file PRF. If the value was recomputed in the previous instruction cycle, it is read from the input to detect pipeline register DTR. Otherwise, if the value was recomputed two cycles previous, it is read from the input to write-back pipeline register WBR. If the value was not recomputed in the previous two cycles, but was recomputed three cycles previous, it is read from the input to program register file PRF.

Bypass networks BN1 and BN2 differ from prior-art bypass networks in that they operate on a subword basis so that it is possible for different subwords of an operand to be read from different stages of pipeline PIP. For example, consider the following instruction sequence:

PCompare r01,r02,r00,0
PCompare r03,r04,r00,1
PCompare r05,r06,r00,2
PCompare r07,r08,r00,3
PCompare r09,r10,r00,4
PCompare r11,r12,r00,5
PCompare r13,r14,r00,6
PCompare r15,r16,r00,7
Tally r00,r17

Each PCompare instruction compares 64-bit operands in two program registers, e.g., r01 and r02, on a byte-by-byte basis. For each byte, if the value in the first specified register, e.g., r01, is greater than the value in the second specified register, e.g., r02, the result is a "1"; otherwise, the comparison results in a "0". Since there are eight bytes in a 64-bit operand, each PCompare instruction yields an 8-bit result. Each 8-bit PCompare result is stored in the third specified register, e.g., r00, at the specified byte location 0–7. Once the eight PCompare instructions clear the pipeline, result register r00 holds the eight comparison results at respective byte locations.

A tally instruction can then count the number of 1s in the result register to provide, for example, an overall match measure for the contents of two sets of eight registers. If only one functional unit is used to execute the foregoing instruction sequence, when the tally instruction is issued, the last three PCompare results are still in pipeline PIP. Thus, the most significant byte for the tally instruction must be read from the input to the detect pipeline register DTR, the second-most-significant byte must be read from the input to the write-back pipeline register WBR, and the third-most-significant byte must be read from the input of the program register file RPF. The five least-significant bytes are read from the program register file PRF. Thus, the values for one register read are provided from four different locations.

The distribution of subword results in a pipeline depends on how the instructions are distributed among functional units when the sequence is subject to parallel processing. For example, where two functional units are used to execute the foregoing program sequence, two bytes are read from each stage of the pipeline and from program register file RPF. For another example, where four functional units are used to execute the program sequence, four bytes are retrieved from each of the first two back-end stages of the pipeline.

Figure 3:
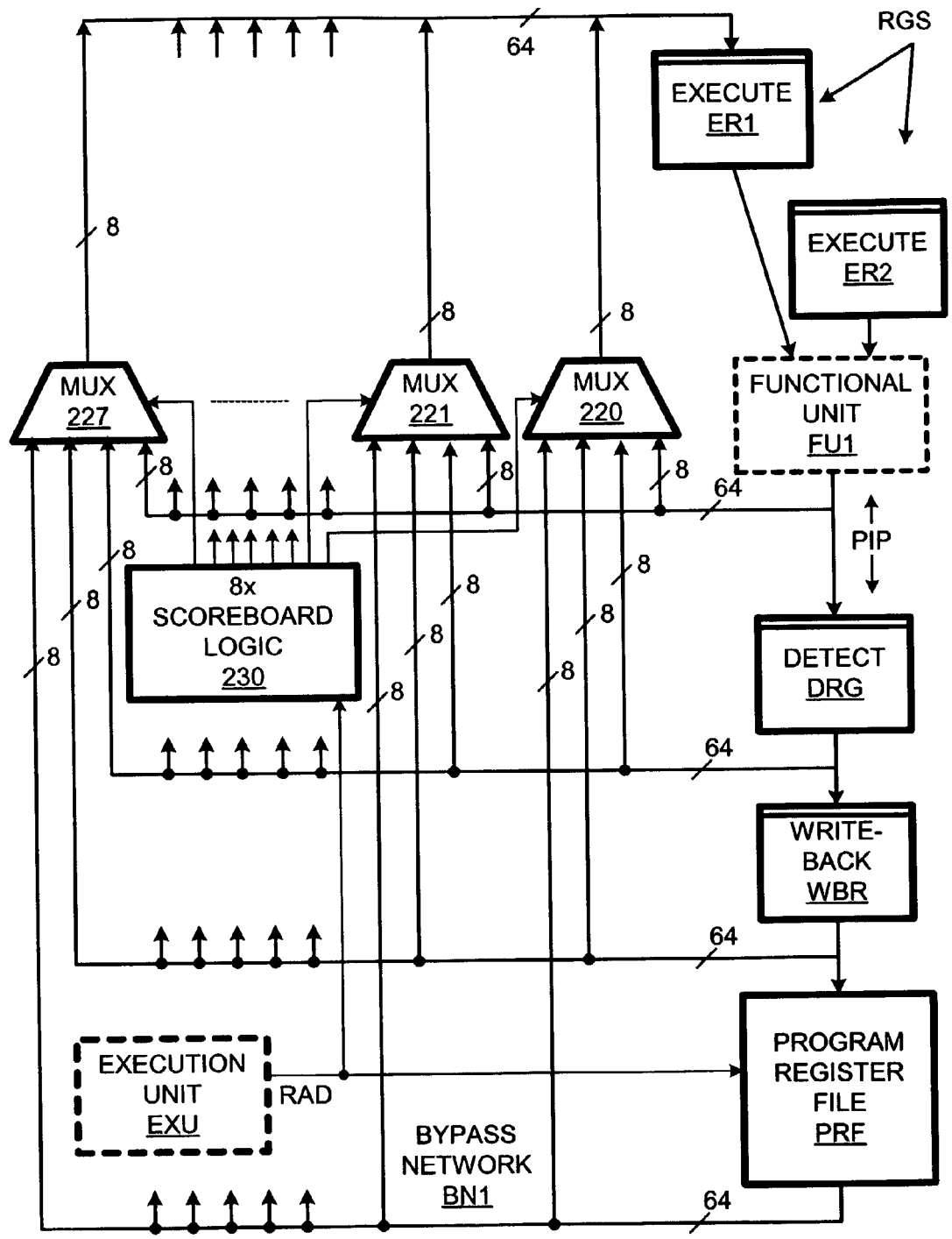
FIG. 3 is a schematic diagram of a bypass network of the register system of FIG. 2.

The design that permits the bypass networks to draw values associated with a single read operation from different pipeline locations is shown with respect to bypass network BN1 in FIG. 3. Bypass network BN1 has eight multiplexers 220–227 and scoreboard logic 230. Each multiplexer is shown with four 8-bit inputs respectively coupled to: a read output of program register file PRF, a write-back input to program register file PRF, an input to write-back register WBR, and an input for detect register DTR of register system RGS. In addition to the inputs shown in FIG. 3, each multiplexer has inputs connected to each back-end pipeline stage for the functional units FU2–FU4 not shown in FIG. 3; accordingly, multiplexes 220–227 are 13:1 multiplexers. Each multiplexer 220–227 has an 8-bit output coupled to execute pipeline register ER1.

Execution unit EXU transmits register addresses to program register file PRF along register address bus RAD. Along with the register addresses, bus RAD carries read-word and write-byte enable signals. In the event of a read operation, the destination functional unit and execution register ER1, ER2 is specified. The register address information is also directed to scoreboard logic 230 so that it can track write addresses for all four functional units FU1–FU4 and respond as a function of a current read address for its respective execute pipeline register ER1. Each function unit FU1–FU4 has execute operand pipeline registers such as ER1 and ER2, as well as a bypass network for each such pipeline register.

Scoreboard logic 230 controls multiplexers 220–227 independently of each other as a function a current read address and recent write addresses. Since data processor 110 supports writes to individual byte locations of program register file PRF, the most-recently computed values for storage in a register can be distributed among all three back-end pipeline stages as well as register file PRF itself. Accordingly, bypass network BN1 is designed to assemble the contents for a register read operation byte-by-byte from different pipeline locations as necessary. Thus, in the case of a program segment with eight parallel comparisons writing to different byte positions of the same result register followed immediately by a tally of the number of 1s in the result register, wherein the program segment is executed by a single functional unit, bypass network BN1 would assemble the contents to be tallied from all four possible locations: one byte from each pipeline stage and five bytes from the result register itself.

By way of comparison, the analogous scoreboard logic for a bypass network similar to that used in the Itanium 2 processor would control all eight multiplexers in unison rather than independently, which is tantamount to controlling a single multiplexer with thirteen 64-bit inputs and one 64-bit output. A result could still come from a program register or any back-end pipeline stage, but all bytes of a requested operand would come from the same register or pipeline stage. Data processor 110 provides advantages when executing series of instructions that call for the results to be packed into a single register. More specifically, data processor 110 is advantageous with two-operand instructions that provide subword-size results. Examples of such instructions include parallel subword compare instructions, almost any instruction that tallies the number of 1s or zeroes in an intermediate result, and an intra-word sum of parallel differences (or absolute value of differences).

The invention applies to any register-word size, and the subword size can be any fraction of the subword size, although typically the fraction is the inverse of a power of two. The instruction set for data processor 110 includes instructions that specify whole-register writes, instructions that provide single-subword writes, and instructions that provide for plural but not all subwords to be written. In any of these cases, the scoreboard logic tracks the pipeline location of the most recently computed subword values for all program registers.

The novel instructions provided for by data processor 110 provide for subword writes. Other embodiments of the invention provide for addressing program registers on a subword basis for both reads and writes. For example, an instruction can call for assembling a word of data from subwords of plural registers. For example, an indirect-indexing instruction can call for eight bytes to be read from a special-purpose index register. Each index-register byte points to a subword location in the general-purpose register file, and the instruction provides the contents of the indicated subword locations packed as a single word.

The present invention provides for subword result packing without using general-purpose packing instructions (e.g., shift, or, add) or special-purpose packing instructions (Mix) and without requiring the result register to be read before it is written to. This latter advantage allows all available register read ports to be used for reading operands. In the context of a general-purpose processor design, this allows two-operand packing instructions; with more operands available for special-purpose processors. Furthermore, the invention allows plural functional units to write concurrently to the same register, reducing program dependency depth, simplifying programming, and enhancing performance. These and other variations upon and modifications to the illustrated embodiments are provided for by the present invention, the scope of which is defined by the following claims.

The invention claimed is:

1. A data processor comprising:
   an instruction decoder for decoding program instructions including a first instruction calling for reading from a first program register;
   an execution unit for executing said first instruction so that a read request is issued to said resister system; and
   a register system including a register file with plural program registers including said first program register, a data pipeline, and bypass circuitry, said bypass circuitry responding to said read request by selecting between said first program register and said pipeline as data sources on a subword-by-subword basis.

2. A method comprising:
   executing an instruction calling for a read from a first program register of a register file; and
   responding to said read request by selecting between data stored in said first program register and a data pipeline on a subword-by-subword basis.

* * * * *

UNITED STATES PATENT AND TRADEMARK OFFICE
CERTIFICATE OF CORRECTION

PATENT NO. : 7,103,756 B2
APPLICATION NO. : 10/261131
DATED : September 5, 2006
INVENTOR(S) : Dale Morris It is certified that error appears in the above-identified patent and that said Letters Patent is hereby corrected as shown below:

In column 8, line 10, in Claim 1, delete "resister" and insert -- register --, therefor.

Signed and Sealed this

Fifth Day of January, 2010

David J. Kappos
*Director of the United States Patent and Trademark Office*